United States Patent [19]
Cowley et al.

[11] 3,757,570
[45] Sept. 11, 1973

[54] SIMULATED LOAD FOR INTERNAL COMBUSTION ENGINES

[75] Inventors: Richard Thomas Cowley, Littleton; Leonard Robin Hulls, Marblehead, both of Mass.

[73] Assignee: RCA Corporation, New York, N.Y.

[22] Filed: Oct. 6, 1971

[21] Appl. No.: 187,068

[52] U.S. Cl. .................................................. 73/116
[51] Int. Cl. .......................................... G01m 15/00
[58] Field of Search ............... 73/117.3, 116, 117.2; 324/19; 123/117 R

[56] References Cited
UNITED STATES PATENTS

| | | | |
|---|---|---|---|
| 2,712,814 | 7/1955 | Harr | 123/117 R |
| 3,356,082 | 12/1967 | Jukes | 123/117 R |
| 3,430,615 | 3/1969 | Chavis | 123/117 R |
| 3,543,572 | 12/1970 | Summerer et al. | 73/116 |
| 3,400,579 | 9/1968 | Paramater et al. | 73/117.3 |
| 3,374,667 | 3/1968 | Mayer | 73/119 A |

*Primary Examiner*—Jerry W. Myracle
*Attorney*—Edward J. Norton

[57] ABSTRACT

Apparatus and process for testing and analyzing the overall performance of an internal combustion engine by providing a simulated load to the engine. The simulated load is effected by periodically interrupting the engine ignition to reduce the total developed power of the engine to a value equal to the frictional horsepower at a desired speed. The period of the interruption cycle is controlled in response to the desired speed.

11 Claims, 13 Drawing Figures

INVENTORS.
Richard T. Cowley and
Leonard R. Hulls
BY Edward J Norton
ATTORNEY

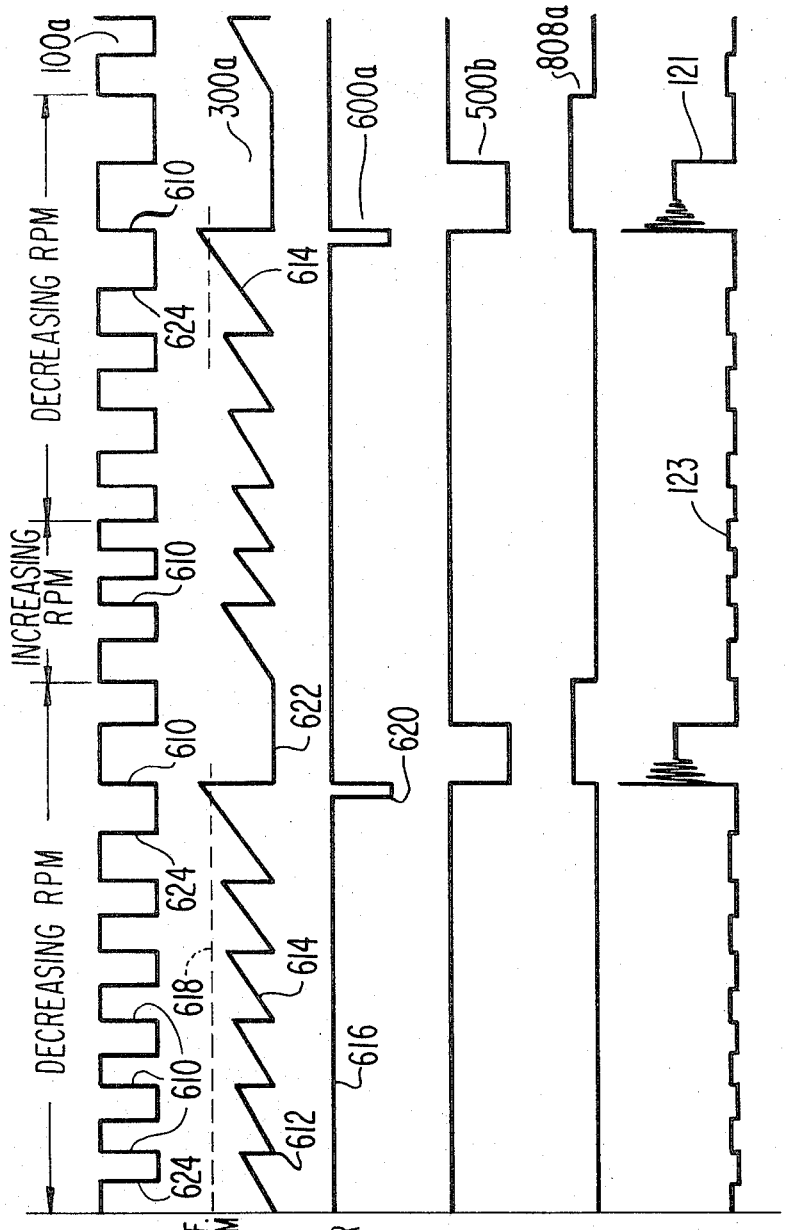

SIMULATED LOAD FOR INTERNAL COMBUSTION ENGINES

BACKGROUND OF THE INVENTION

1. Field of the Invention

The present invention relates to a system for performance testing and analyzing of internal combustion engines. In particular, the invention relates to a method and apparatus for providing a simulated load for overall performance testing of an engine.

2. Description of the Prior Art

In the testing of internal combustion engines it is common to inhibit the ignition of one or more cylinders in order to determine the contribution of such cylinder or cylinders to the total performance of the engine. An analysis of the resulting engine performance, e.g. variations in engine speed as obtained from a tachometer, reflects either individually, or as compared to other cylinders, mechanical operating conditions within the cylinders.

Such tests are normally conducted on an unloaded engine and at a predetermined speed such as idle or high (or fast) idle speed. Meaningful operational and diagnostic testing of the overall performance of internal combustion engines, however, requires that the carburetor and intake system be exercised over the full ranges of fuel and air flow. Further, combustion chamber pressures must reach the relatively high full load value in order for the presence of a malfunction to be more readily detected. To permit performance testing under these conditions a load must be applied to the engine under test. If the amount of fuel or air fuel mixture delivered to an internal combustion engine, operating without a load, is increased beyond that required for maximum speed, the engine will overspeed. If an engine is allowed to overspeed, damage can result. Moreover, an unloaded engine will overspeed long before the maximum fuel and air flows are reached.

In automotive applications, the usual methods for applying a load to an internal combustion engine is by road loading or using an external variable load such as a chassis dynamometer. Since with road loading the magnitude of the load cannot be measured, a chassis dynamometer procedure is preferred where meaningful operational and diagnostic testing is required. A chassis dynamometer comprises, in general, at least one pair of large drums or rollers mounted below the grade level of a test platform with their axis in parallel relation and an instrumentation system for measuring the absorbed power. The drive wheels of the vehicle under test are placed in contact with the rollers. By applying a load or dissipation means to the rollers, the engine can be operated under any desired combination of load and speed.

SUMMARY OF THE INVENTION

According to this invention, an internal combustion engine is operated without an external load over the range of speeds and throttle settings which hav previously only been attainable by dynamometer loading or road loading.

In one form the apparatus for providing a simulated load to an internal combustion engine, having an ignition system to produce ignition, comprises first means for inhibiting the ignition, second means for providing a predetermined inhibit period, and third means coupled to the first means and further coupled to the second means for inhibiting the ignition during the inhibit period.

A feature of the invention further includes means for providing a variable inhibit period, means for detecting the speed of the engine and comparison means coupled to the speed detecting means. The comparison means includes reference means for comparing the engine speed to the reference means. The comparison means being further coupled to the variable inhibit period means for adjusting the period in response to the variations of the engine speed about the reference means.

BRIEF DESCRIPTION OF THE DRAWING

FIGS. 6a–6f are timing diagrams of the waveforms which are produced in the circuit shown in FIG. 5.

DETAILED DESCRIPTION

The available output power or brake horsepower (BHP) of an internal combustion engine is equal to the indicated horsepower (IHP) minus the friction horsepower (FHP). The IHP represents the total developed power in the cylinders of the engine. The FHP represents the internal losses of the engine and is attributable to four factors: (1) friction loss in bearings, rings, pistons and valve gear; (2) compression of air and fuel mixtures prior to combustion; (3) pumping power required to deliver the air and fuel into the cylinders; and (4) engine auxiliaries which require power such as the cooling fan, water pump, fuel pump, oil pump and generator.

Figure 1A:
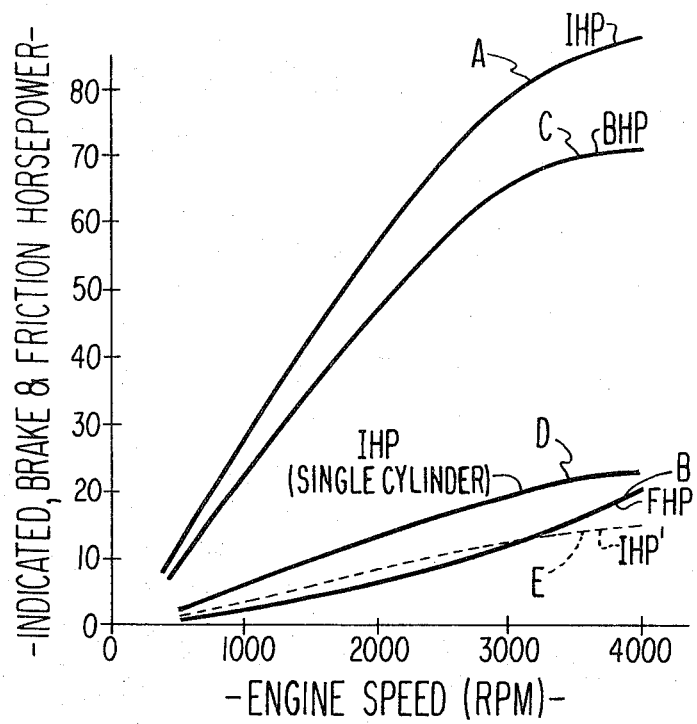
FIG. 1a is a graphic representation illustrating the relationship of horsepower over the speed range of a typical internal combustion engine.

Referring now to FIG. 1, there is shown a graph of curves plotted to show the indicated brake and friction horsepower over the speed (R.P.M.) range of a typical four cylinder internal combustion engine. The data for the curves were obtained by motoring a U.S. Military L141 spark ignition jeep vehicle. The IHP is represented by curve A and curve B represents the FHP. The BHP representing the difference, IHP–FHP, is illustrated by curve C. The IHP contribution of a single cylinder is represented by curve D. Curve E illustrates a theoretical IHP curve which is equal to one-sixth (or 16.6 percent) of curve A along the entire operating range.

The IHP, as well as the BHP, of an internal combustion engine is increased by increasing the engine speed. The speed of the engine is ordinarily increased by advancing the throttle to increase the fuel flow. In response to an advance of the throttle setting, the engine speed will increase until a steady-state condition is reached. The engine speed at a particular throttle setting will reach a steady state value when the IHP equals the sum of the FHP and the power dissipated in the load. In other words, assuming that the load remains constant, the increasing IHP, and, therefore, BHP, results in an increasing engine speed up to a value where the increased FHP offsets the increased BHP.

The load applied to the engine can be an external load such as a dynamometer or the more typical case of the work done by the engine such as propelling a vehicle. If, however, the engine is insufficiently loaded or operated without a load and the throttle is advanced, the engine will overspeed before a steady-state condition can be reached. If an engine is allowed to accelerate until it overspeeds, mechanical damage may result due to the centrifical and inertial forces on the moving parts exceeding their design values.

A study of the curves of FIG. 1 shows that if the IHP of an unloaded engine is adjusted to a value equal to the FHP at a particular speed setting, a steady-state condition will result at that speed setting. Under these circumstances the BHP (which is equal to IHP-FHP) is reduced to zero value and the reduced IHP just offsets the FHP. As the throttle is advanced beyond its normal setting, corresponding to an otherwise properly loaded engine, for the particular speed, the IHP will tend to increase; however, the FHP will also tend to increase with the result that the engine speed is kept constant notwithstanding the change in throttle setting. Likewise, if the throttle setting is retarded below its normal setting, for an otherwise properly loaded engine, the IHP will tend to decrease; again, however, the FHP will also tend to decrease with the result that the engine maintains a constant or steady-state speed. It is noted that when the BHP is reduced to zero, the available output power of the engine is zero and the total developed power in the cylinders is dissipated by the internal losses or FHP of the engine. Thus, in accordance with the principle of the present invention, by adjusting the IHP of an engine to a value equal to its FHP at a particular speed setting, the engine can be operated without an external load and at any throttle setting including wide-open-throttle. Similarly, the speed on an unloaded engine can be controlled at any speed setting below the maximum speed rating at which it would normally run under loaded conditions for a particular throttle setting.

Curve E of FIG. 1 represents the resulting total developed power IHP' in the cylinders when the IHP is reduced to one-sixth of its normal operating level over the entire speed range. It can be seen that curve E intersects the FHP curve at approximately 3,150 R.P.M. The intersection of these curves represents the steady-state speed value that is achieved when the IHP is adjusted to one-sixth or 16.6 percent of its normal operating level. In a similar manner, if the IHP were adjusted to one-fifth or 20 percent of its normal operating level, the engine would reach a steady-state condition at that speed where a curve representing 20 percent of IHP intersected the FHP curve. It is noted that the IHP, of the engine is shown in FIG. 1, must be adjusted to a value less than that contributed by one cylinder in order to reach a steady-state condition which is below the maximum operating speed of the engine.

In the present invention the IHP is adjusted to establish the desired value or to be equal to the FHP at a desired speed by interrupting the ignition system such that the cylinders are fired at a rate which is just sufficient to overcome the FHP losses at the desired speed. In effect, during their inoperative cycles the cylinders act as an external load contributing to the FHP without contributing to the overall IHP of the engine. The IHP is adjusted by periodically interrupting the ignition in a predetermined ignition-on to ignition-off ratio.

By inhibiting the ignition in a periodic fashion, the IHP is reduced to a value determined by the ratio of the ignition-on period to the total ignition-on plus ignition-off period. For example, if the ignition interruption cycle is fixed such that the ignition-on period is one-sixth of the total period, the IHP will be reduced to 16.6 percent of its normal operating level. In this example an engine operated in such a manner will reach a steady-state condition at the speed where 16.6 percent of the IHP equals the FHP.

By varying the fixed ratio of the ignition interruption cycle in discrete steps, the speed of the engine can be controlled to a predetermined speed over the entire operating range. Alternately, if the engine speed is continuously measured as, for example, by a tachometer and compared to a predetermined reference speed, the difference detected can be used to automatically adjust the periodic ignition-on to ignition-off ratio of the ignition interruption cycle. This provides a closed loop control of engine speed which adjusts automatically to speed variations and which can be continuously varied over the entire operating range.

It has been discovered that if the ignition is inhibited for a prolonged period, an excessive unburned fuel mixture will accumulate in the exhaust system. In order to avoid the possibility of a damaging explosion in the exhaust system, the frequency of the interruption cycle is kept sufficiently high in order to ignite and purge the unburned fuel. It has been discovered that by ensuring one firing after no more than 10 inhibited cylinder firings, an excessive unburned fuel accumulation is prevented.

As a consequence of permitting one firing after approximately 10 inhibited cylinder firings, the minimum value to which the IHP can be adjusted is one-eleventh or approximately 9 percent. Therefore, the minimum steady state speed value is limited to that speed where the curve representing 9 percent of the IHP intersects the FHP curve. However, in a typical internal combustion engine equipped the usual engine auxiliaries; such as, a cooling fan, water pump, generator, etc, the FHP curve will intersect the 9 percent IHP curve in the idle or fast idle speed range. Thus, the dynamic operating range of the engine is substantially uncompromised by the requirement to purge the accumulation of unburned fuel.

Figure 1B:
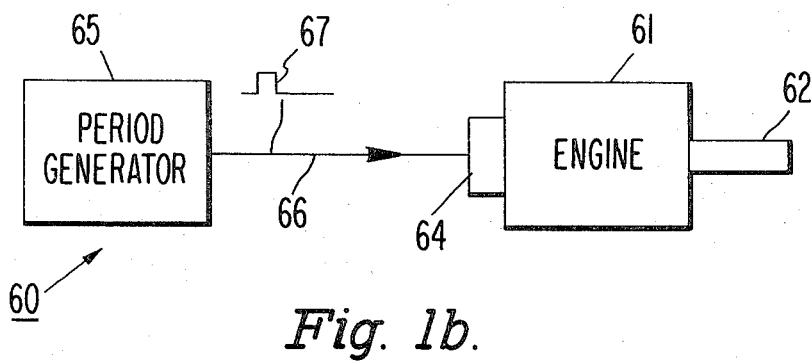
FIG. 1b is a block diagram of a system for providing a simulated load to an internal combustion engine in accordance with the present invention.

Referring now to FIG. 1b, there is shown a block diagram of a system for providing a simulated load to an internal combustion engine by providing an ignition interruption cycle in accordance with the present invention. The system 60 illustrated in FIG. 1b includes an internal combustion engine 61 having a crank shaft 62 and an ignition interrupter switch 64. Period generator 65 generates a recurrent signal 67 having a predetermined pulse period, whose pulse width may be adjustable, and provides at an output 66 signal 67 which is coupled to the ignition interrupter switch 64. Switch 64 comprises apparatus for inhibiting the ignition of engine 61 during a predetermined portion of signal 67 and is preferably of an electronic type, although it may be electromechanical or mechanical.

Period generator 65 may be of any conventional type, but is preferably an electronic circuit having a variable-width squarewave output. For example, generator 65 may comprise an astable multivibrator whose output is used to control a monostable multivibrator. In this configuration the frequency of the interruption cycle is determined by the operating frequency of the astable multivibrator; and, the desired ignition-on period during the interruption cycle is controlled by the monostable multivibrator, which may be activated by the astable multivibrator at the start of each interruption cycle. The output of the monostable multivibrator provides signal 67 at output 66. The signal 67 at output 66 of generator 65 controls ignition interrupter switch 64 so that the ignition of engine 61 functions normally during the desired ignition-on period and is inhibited during the remainder of the interruption cycle. In this example, the desired ignition-on period is determined by the pulse width of the output from the monostable multivibrator.

Assume that engine 61 is a four-cycle, four-cylinder engine. In this case the ignition system of engine 61 provides 100 ignition firings per second when the engine is operating at 3,000 R.P.M. As described above, the frequency of the interruption cycle must be kept sufficiently high so as to avoid an accumulation of unburned fuel in the exhaust system (not shown) of engine 61. Since, as described above, it is desirable to permit one ignition firing after ten inhibited firings, the ignition-off period should not exceed 100 milliseconds when the engine 61 is to be operated at 3,000 R.P.M. Accordingly, one 10 millisecond ignition-on period at the start of each 110 millisecond interruption cycle provides a suitable minimum frequency for the interruption cycle.

In accordance with the above-mentioned example, an astable multivibrator having a period of 110 milliseconds which is combined with a monostable multivibrator having an adjustable pulse width, adjustable from a minimum of 10 milliseconds up to the desired maximum ignition-on period, provides a suitable arrangement for period generator 65. At other engine operating speeds, the astable multivibrator period and the monostable multivibrator pulse width may be varied proportionately in order to provide an interruption cycle which exhibits a frequency sufficiently high to avoid an accumulation of unburned fuel.

Figure 1C:
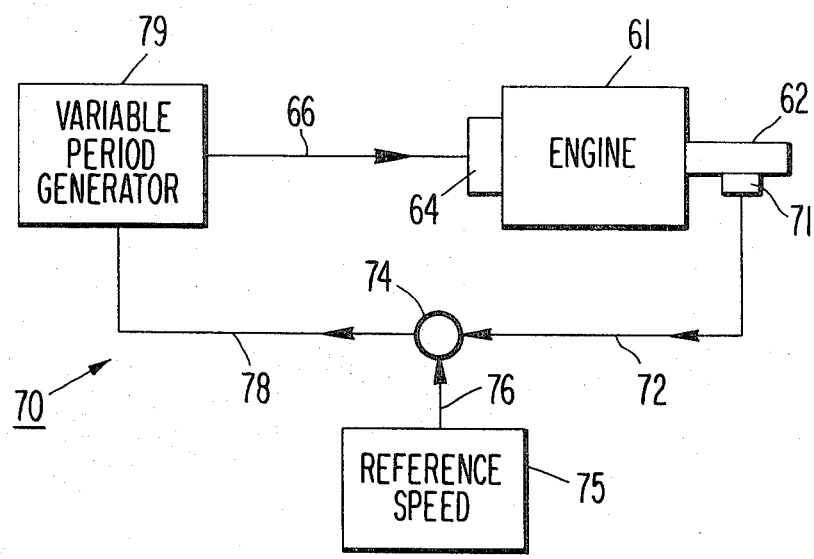
FIG. 1c is a block diagram of a closed loop system for providing an ignition interruption cycle in accordance with the present invention.

In FIG. 1c, wherein like elements bear like numerals, there is shown a closed loop system 70 for providing an ignition interruption cycle in accordance with the present invention. A tachometer 71 is coupled to crankshaft 62. Tachometer 71 having an output 72 is coupled to a first input of comparator 74. A reference speed source 75 having an output 76 is coupled to a second input of comparator 74. An output 78 of comparator 74 is coupled to an input of variable period generator 79.

Tachometer 71 provides an output signal which is proportional to the speed of engine 61. The output of reference speed source 75 provides an output signal which represents a desired speed of engine 61. The output of comparator 74 provides an output signal which is proportional to the difference between its input signals. The output signal of comparator 74 is used to vary the pulse width of the output signal of variable period generator 79. For example, if the speed of engine 61 drops below the selected reference speed, the pulse width of the output signal of variable period generator 79 increases. Similarly, if the engine speed climbs above the reference speed, the pulse width of the output signal from variable period generator 79 decreases. The output of reference speed source 75 may be varied to provide any desired reference speed within the operating limits of engine 61. In the above described manner, the ignition interruption cycle automatically adjusts to constrain the speed of the engine 61 to the reference speed.

The variable period generator 79 may be of any conventional type, but is preferably an electronic circuit having a squarewave output whose pulse width is controlled by the output signal from comparator 74. For example, generator 79 may comprise an astable multivibrator whose output is used to control a monostable multivibrator in a manner similar to the period generator described in conjunction with FIG. 1b. In this case, however, the pulse width of the monostable multivibrator is automatically controlled by the output signal from comparator 74. Comparator 74 may comprise a conventional voltage comparator which provides an output voltage at output 78 which is proportional to the difference between input voltages provided by tachometer 71 and reference speed source 75. In this example, the output voltage from comparator 74 is used to control the time constant of the monostable multivibrator and, therefore, the pulse width of the output signal from generator 79.

Figure 2:
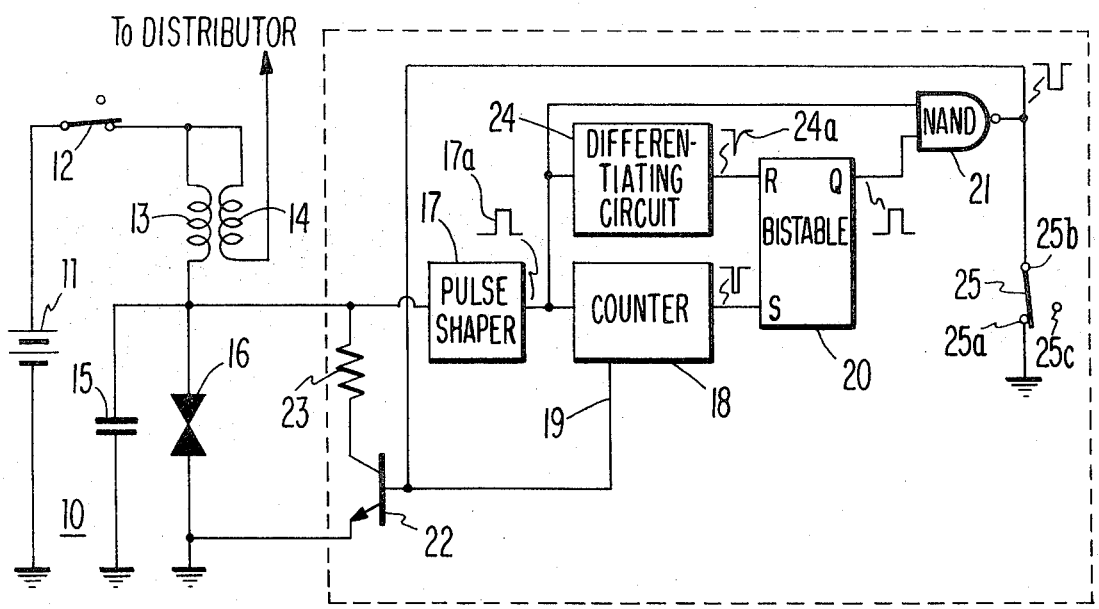
FIG. 2 is a block diagram of one embodiment of the present invention in an ignition system of an internal combustion engine.

Referring now to FIG. 2 there is shown a block diagram of one embodiment of the present invention in an ignition system of an internal combustion engine. According to this embodiment, the ignition timing of the engine is preserved with respect to engine and cylinder cycles. The ignition system 10 includes a battery 11, an ignition switch 12, an ignition coil including a primary winding 13 and secondary winding 14, a capacitor 15 and breaker points 16. The secondary winding 14 is connected at one end to the primary winding 13 and connected at the other end to the distributor (not shown) which in turn is connected to the engine spark plugs (not shown) in a conventional manner.

The ignition system 10 operates in the conventional manner. The battery 11, having its negative terminal grounded, is connected to the primary winding 13 of the coil through the ignition switch 12. The primary circuit is completed back to the battery 11 through the breaker points 16, which are bypassed by the capacitor 15, and a magnetic field builds up in the primary winding 13. The breaker points 16 open and close in synchronization with engine and cylinder cycles. When the breaker points 16 open, the primary current decreases almost instantly and the magnetic field collapses. This collapsing field induces a high voltage in the secondary winding 14 of the coil which is fed sequentially to the spark plugs via the distributor. The capacitor 15 reduces arcing at the breaker points 16 as they open.

The means for providing a simulated load to the engine includes a pluse shaper 17 which detects the opening and closing of the breaker points 16. The output signal 17a from pulse shaper 17 provides a positive square wave pulse each time the points open and close. The output signal 17a, having a leading edge which occurs coincident in time with the opening of the points and having a trailing edge coincident with the closing of the points, is thus synchronized with engine and cylinder cycles. The output of pulse shaper 17 is jointly connected to a counter 18, a NAND gate 21 and a differentiating circuit 24. The counter 18 counts on the leading edge of each pulse 17a and provides a ground (hereinafter "low") potential at its output after a predetermined number of pulses have been counted. The counter 18 includes a reset input 19 which clears the counter for another count upon the occurrence of a reset pulse as explained below. The output of counter 18 is connected to the S input of a two-input bistable multivibrator (hereinafter "bistable")20. A low potential at the output of counter 18 sets the Q output of bistable 20 to a positive (hereinafter "high") potential. The Q output of bistable 20 is connected to NAND gate 21 along with the output of pulse shaper 17. When both inputs to NAND gate 21 are high, its output will go low. The output of NAND gate 21 is connected to the base of a NPN transistor 22 and to the reset input 19 of counter 18. The emitter of transistor 22 is connected directly to ground and its collector is connected to one end of a small value resistor 23. The other end of resistor 23 is connected to the junction of breaker points 16, capacitor 15 and primary winding 13. With a high potential applied to its base, transistor 22 conducts heavily and thereby provides a shunt across breaker points 16. During the conduction period of transistor 22, even though the points open and close in synchronism with engine and cylinder cycles, the magnetic field stored in primary winding 13 is prevented from collapsing. Accordingly, the ignition is inhibited during the time that a high potential is applied to the base of transistor 22.

After a predetermined number of pulses have been counted, the low potential at the output of counter 18 sets the Q output of bistable 20 high which in turn provides a high potential at one input of NAND gate 21. Thereafter, the presence of a high potential at the other input of NAND gate 21, as provided by wave shaper 17, causes the output of NAND gate 21 to go low. With this low potential applied to its base, transistor 22 is cut off thereby permitting cylinder ignition upon the opening of the shunt across points 16. The low potential at the output of NAND gate 21 is also applied to reset input 19 of counter 18 which resets the output of counter 18 to a high potential until a predetermined number of pulses is again counted.

The positive square wave output 17a from pulse shaper 17 is also applied to a differentiating circuit 24 which converts the square wave output into a negative voltage spike 24a for the trailing edge of the waveform 17a. The output 24a of differentiating circuit 24 is therefore representative of the closing of the breaker points. The output from differentiating circuit 24 is connected to the R input of bistable 20 and resets the Q output of bistable 20 to a low potential. The ignition-on period is thus limited to one firing before being reset.

It is noted that the small value resistor 23 in series with the collector of transistor 22 develops a voltage drop so that wave shaper 17 can continue to detect the opening and closing of the breaker points even though transistor 22 is conducting.

Furthermore, since NAND gate 21 will not provide an output until the breaker points 16 have opened, the ignition timing with respect to the engine and cylinder cycles is preserved. Further, since bistable 20 will remain in a set condition until reset by the closing of the breaker points 16, counter 18 can be reset during the time the engine is firing. Hence, the counter is allowed time to clear before the next count period begins.

In practice it is desirable to disable or render inoperative the circuit shown in FIG. 2 during the engine starting sequence. The engine is thereby allowed to come up to speed before the ignition interruption process begins. This is accomplished with a switch 25. One terminal 25a of single-pole double throw switch 25 is connected to ground and the other terminal 25b is connected to the output of NAND gate 21. When switch 25 is closed, the output of NAND gate 21 is low and the ignition will operate without interruption until switch 25 is opened to position 25c.

The desired ignition-on to ignition-off ratio, and therefore the desired IHP, can be selected in discrete steps by selecting the desired output count from counter 18. For example, if the counter 18 is arranged to provide an output after counting six pulses, i.e., one ignition firing after five misses, the IHP will be reduced by such misses to approximately 16.6 percent. This is illustrated in the curves of FIG. 1 wherein 16.6 percent of IHP equals the value of FHP at approximately 3,150 R.P.M. As a further example, if the counter 18 is arranged to provide an output after counting ten pulses, the IHP will be reduced to 10 percent of maximum at any speed. In this case, the engine will reach a steady-state condition at the speed where 10 percent of the IHP equals the FHP.

It should be noted that by utilizing the detected ignition pulses to determine the desired ignition-on to ignition-off ratio (or ignition interruption cycle), the minimum period of interruption is automatically adjusted to the speed of the engine. That is, the ignition-on period occurs after a fixed number of ignition pulses independent of engine speed. Further, since as described above, the detected ignition pulses are also used to gate the ignition-on period, the ignition interruption cycle exhibits a synchronized relation to ignition timing which would not be readily achieved using an externally generated period.

The counter, as shown in FIG. 2, may be of any known type, but preferably is a four stage binary counter combined with a one-in-10 binary coded decimal decoder; such as, the standard 8293 counter integrated circuit combined with the standard 7441 integrated circuit BCD-Decimal Decoder. In such an arrangement, the one-in-ten decoder provides ten outputs which sequentially go low when the corresponding count is reached. By interfacing the outputs of the one-in-10 decoder with a rotary switch, having a common contact, the predetermined count can be independently selected at the exclusion of all others. The method of counting engine and cylinder pulses as shown in FIG. 2 utilizes the leading edge of the pulse shaper waveform; however, since the 8293 binary counter counts on negative going pulses, the clock input to the counter should be inverted by a conventional inverter stage.

Figure 3:
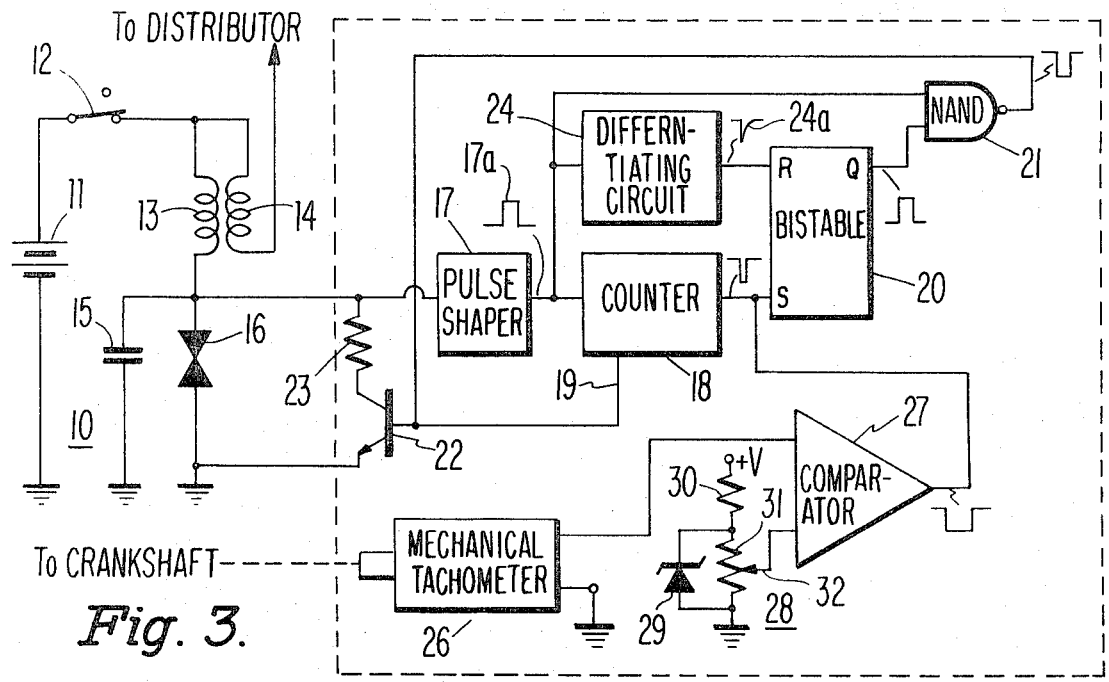
FIG. 3 is a block diagram of another embodiment of the present invention shown in conjunction with an electromechanical tachometer.

Referring now to FIG. 3, there is shown a block diagram of another embodiment of the present invention. The apparatus shown in FIG. 3 is similar to that of FIG. 2 and like elements bear like reference numerals. According to this embodiment, the engine speed is continuously measured by a tachometer 26 coupled to the engine crankshaft (not shown). Tachometer 26 develops a D.C. voltage which is proportional to the speed of the engine. The output of tachometer 26 is connected to one input of comparator 27. The other input of comparator 27 is connected to a reference voltage source 28 formed of a zener diode 29 serially connected with a resistor 30 between a source of positive potential +V and ground. The value of resistor 30 is chosen to constrain the operation of zener diode 29 to its reverse conduction breakdown characteristic. Variable resistor 31 is connected between the junction formed by resistor 30 and zener diode 29 and ground. The movable arm 32 of variable resistor 31 is connected to the other input of comparator 27. Source 28 thereby provides a regulated reference voltage which is adjustable. Comparator 27 compares the D.C. voltage output from tachometer 26 against the reference voltage which is adjustable. Comparator 27 provides a high output when the D.C. voltage is equal to or exceeds the reference voltage and a low output when the reference voltage exceeds the D.C. voltage.

The output of comparator 27 is connected to the S input of bistable 20. Thus, when the D.C. voltage derived from tachometer 26, which represents the engine speed, drops below the reference voltage from source 28, the Q output of bistable 20 is set high. The remaining operation of the apparatus as shown in FIG. 3 is substantially identical to that shown in FIG. 2 and accordingly need not be repeated. However, since comparator 27 will continuously provide a low output when the engine speed is below the desired or reference speed, the ignition will not be interrupted until the desired engine speed is reached. Therefore, the starting switch 25 shown in FIG. 2 is not required. It is to be further noted that the counter function (counter 18) in the embodiment of FIG. 3 avoids the possibility of accumulating an unburned fuel mixture in the engine exhaust system which might otherwise occur if the ignition were inhibited for a prolonged interval; such as, during an overshoot in speed.

Figure 4:
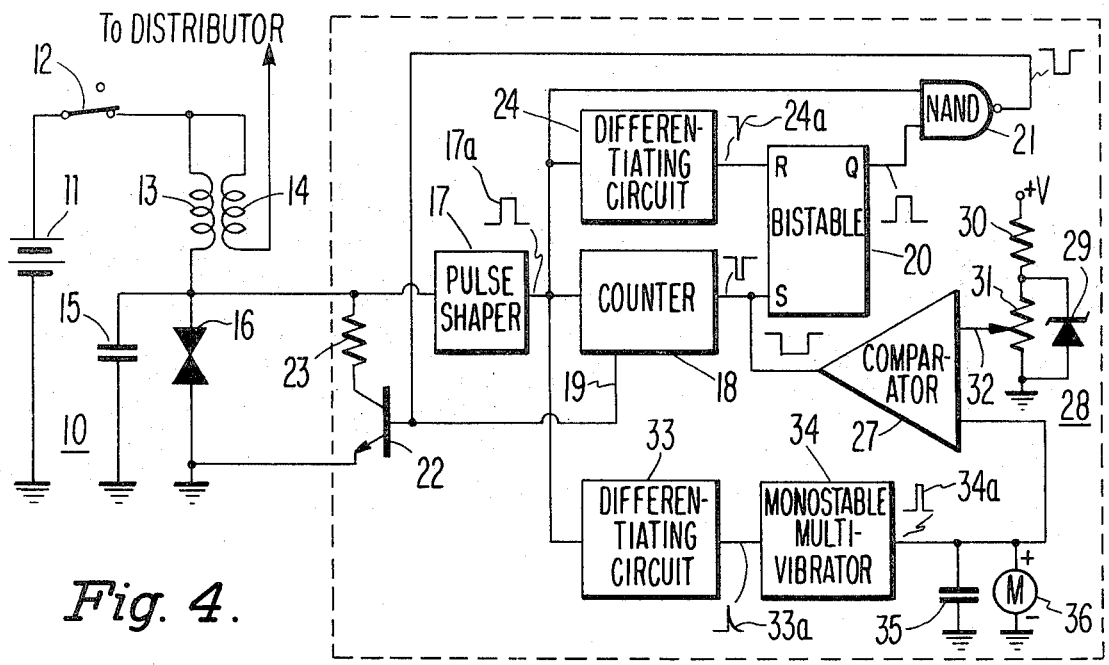
FIG. 4 is a block diagram of another embodiment of the present invention shown in conjunction with an electronic tachometer.

Referring now to FIG. 4, there is shown a block diagram of another embodiment of the present invention. The apparatus shown in FIG. 4 is similar to that of FIG. 3 and like elements bear like reference numerals. The engine speed in this embodiment is continuously detected by an electronic tachometer comprising a differentiating cirucit 33, a monostable multivibrator (hereinafter "monostable") 34 and an integrating capacitor 35. The positive square wave output 17a from pulse shaper 17 is connected to differentiating circuit 33 which converts the square wave output into a positive voltage spike 33a for the leading edge of the waveform 17a. The output of differentiating circuit 33 is therefore representative of the opening of the breaker points 16. The output of differentiating circuit 33 is connected to the input of monostable 34. Monostable 34 provides a square wave output 34a. The time constant of monostable 34 establishes the pulse width of its square wave output. The time constant is selected to provide a pulse width equal to or less than the pulse repetition rate at the maximum engine speed. That is, the output pulse width of monostable 34 is selected so that the time interval between successive openings of the breaker points corresponds to the maximum engine speed. Capacitor 35 integrates the output pulses from monostable 34 and provides a D.C. voltage which is proportional to the speed of the engine. The output of multivibrator 34 is also connected to the positive terminal of a voltmeter 36 and to one input of comparator 27. The voltmeter 35 having its negative terminal connected to ground is calibrated in R.P.M. to provide an indication of engine speed. The other input of comparator 27 is connected to a reference voltage source 28. The operation of comparator 27 and the remaining apparatus shown in FIG. 4 is substantially identical to that shown in FIG. 3 and need not be described further.

In practice the electronic tachometer shown in FIG. 4 is preferred to the electromechanical tachometer shown in FIG. 3. Since the response time of an electromechanical tachometer is limited by its inductance, excessive fluctuation in engine speed will occur about the desired reference speed setting. These fluctuations occur as a result of the extended ignition-on time before the true engine speed can be compared to the reference speed. Under such conditions, the engine will tend to overspeed. Similarly, when the engine speed is decreasing below the reference speed, the speed of response of the electromechanical tachometer will prevent instantaneous correction and an undershoot will occur. Whereas the speed of response of an electronic tachometer, as shown in FIG. 4, is primarily limited to the integration time constant of the output storage capacitor 35 so that the fluctuations about the desired speed are reduced.

To further reduce the speed fluctuation, it has been discovered that the engine speed must be compared to the reference speed on a pulse to pulse basis. One embodiment of the present invention accomplishes this by determining whether to enable or to inhibit the ignition after each ignition-on pulse. However, in a four-cycle engine, the rotational velocity increase which results from a power stroke is not completed before the ignition of the next cylinder. For example, in a four-cycle, eight-cylinder engine, four cylinders will go through their power stroke for each revolution of the crankshaft. Thus, the full increase in engine speed will not be detectable at the next ignition pulse and further ignition may result in an overshoot in speed. Since an increase in engine speed occurs after an ignition-on pulse, the ignition is delayed for one pulse period.

Figure 5:
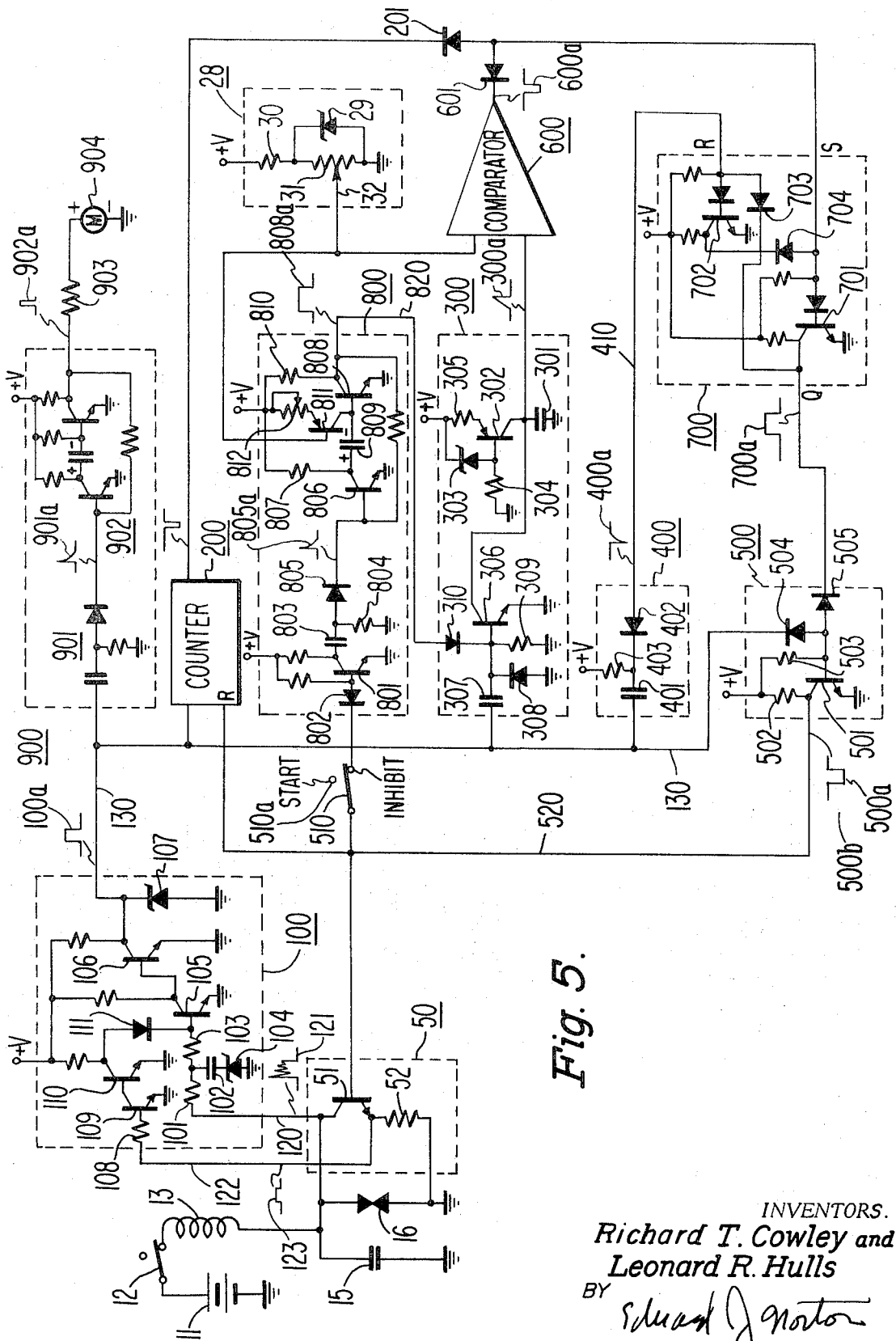
FIG. 5 is a schematic diagram of a preferred embodiment of the present invention.

Referring now to FIG. 5, there is shown a schematic diagram of the most preferred embodiment of the present invention. Referring first to the principle components, pulse shaper 100 detects the opening and closing of the breaker points 16. The output of pulse shaper 100 is connected to a counter 200, a ramp generator 300, a differentiating circuit 400, a NAND gate 500 and an electronic tachometer 900 via conductor 130.

The ramp generator 300 provides a ramp voltage output 300a, which is reset to zero amplitude every time breaker points 16 open and is developed across capacitor 301. Thus, the amplitude of the ramp voltage 300a is a function of the time interval between successive openings of breaker points 16. One terminal of capacitor 301 is connected to the collector of PNP transistor 302. The base of transistor 302 is connected to the junction formed by zener diode 303 and one terminal of resistor 304. The other terminal of resistor 304 is connected to ground and the other terminal of zener diode 303 is connected to a source of positive potential such as +V. The emitter of transistor 302 is connected to +V by way of resistor 305. Transistor 302 thus forms a constant current source which linearly charges capacitor 301. The linear ramp voltage developed across capacitor 301 is discharged to zero amplitude by NPN transistor 306. The emitter of transistor 306 is connected to ground and the collector of transistor 306 is connected to the junction formed by capacitor 301 and transistor 302. The base of transistor 306 is connected to the junction formed by capacitor 307, diode 308, resistor 309 and diode 310. The other terminals of diode 308 and resistor 309 are connected to ground. Capacitor 307 having its other terminal connected to the output of pulse shaper 100, differentiates the square wave pulses 100a into a positive voltage spike (not shown) for the leading edge of the square wave and a negative voltage spike (not shown) for the trailing edge of the waveform. Diode 308 clips the negative voltage spike leaving the positive voltage spike produced by the leading edge of the output from pulse shaper 100. The resulting spike pulse is therefore representative of the opening of the breaker points 16. With a positive spike pulse applied to its base, transistor 306 conducts heavily causing capacitor 301 to discharge rapidly. Diode 310 provides a second input to ramp generator 300. A positive potential applied to diode 310 will cause it to conduct thereby developing a positive voltage across resistor 309 which turns on transistor 306. The function of this second input is discussed hereinafter.

The ramp voltage output of ramp generator 300 is connected to a first input of comparator 600. The second input of comparator 100 is connected to a reference voltage source 28. The comparator 600 may be any of a number of readily available integrated circuit voltage comparators, for example, the Fairchild HL710. Comparator 600 provides a low potential output when the amplitude of the ramp voltage equals or exceeds the reference voltage and a high output when the reference voltage exceeds the ramp voltage. The output of comparator 600 is connected to the S input of bistable 700 through diode 601.

With a low potential on the S input, the Q output of bistable 700 will be set high. Bistable 700 operates as a conventional R–S or set-reset flip-flop circuit. Assuming that the Q output of bistable 700 is initially low, NPN transistor 701 is therefore conductive. NPN transistor 702 is not conductive since its base is pulled low through diode 703. A low at the S input of bistable will turn off transistor 701 causing its collector to go high. A high at the collector of transistor 701 will back bias diode 703, allowing the base of transistor 702 to go high. In this condition transistor 702 is conductive. The collector of transistor 701 will be held low since its base is now pulled low. The Q output of bistable 700 will remain high until a low potential is applied to the R input. With a low potential applied to the R input, transistor 702 will turn off and the Q output of bistable 700 will again go low. The Q output of bistable 700 is connected to a first input of NAND gate 500.

NAND gate 500 includes NPN transistor 501 having its emitter connected to ground. The collector is connected to +V by way of resistor 502. The base of transistor is connected to +V by way of resistor 503. Diodes 504 and 505, having their respective anodes connected to the junction formed by resistor 503 and the base of transistor 501, provide separate inputs to NAND gate 500. The junction formed by the collector of transistor 501 and resistor 502 provides the output of NAND gate 500. When a low potential is applied to either input of NAND gate 500, the base of transistor 501 is pulled low and the collector of the transistor will go high. When a high potential is applied to both inputs of NAND gate 500, the base of transistor will be pulled low. The output of NAND gate 500 is applied to ignition control switch 50.

The input to ignition control switch 50 is connected to the base of NPN transistor 51. The collector of transistor 51 is connected to the breaker points 16. The emitter of transistor 51 is connected by way of a resistor 52 to ground. The operating potential for transistor 51 is obtained from the battery 11 through primary winding 13 and ignition switch 12. With a high potential applied to the input of switch 50, the transistor 51 becomes conductive and thereby provides a shunt across breaker points 16. Hence, the ignition is inhibited when the input to switch 50 is high. A low potential input to switch 50 turns transistor 51 off thereby permitting the breaker points 16 to function normally. The value of resistor 52 is chosen to provide a small voltage drop when transistor 51 is conducting. This voltage drop is applied to pulse shaper 100 so that ignition timing can be detected even though the ignition is inhibited. The collector of transistor 51 is also connected to a first input of pulse shaper 100. The junction formed by resistor 52 and the emitter of collector 51 is connected to the second input of pulse shaper 100.

The first input 120 of pulse shaper 100 detects the ignition primary circuit waveform 121 across the engine breaker points 16. The well known characteristic pattern of the primary circuit waveform 121 across the breaker points is a rapid rise in voltage followed by high frequency oscillations. These oscillations result from the transfer of energy between the primary winding 13 and the capacitor 15. The first input 120 is connected to one terminal of resistor 101, the other terminal being connected to the junction formed by capacitor 102 and resistor 103. The other terminal of capacitor 102 is connected by way of zener diode 104 to ground. The other terminal of resistor 103 is connected to the base of NPN transistor 105. Resistor 101, capacitor 102 and zener diode 104 form a filter which removes any oscillations from the primary waveform. The leading edge of the detected waveform 121 applies a forward bias to the base of transistor 105 causing it to conduct. When the leading edge of the waveform reaches the reverse breakdown voltage, zener diode 104 conducts. Once zener diode 104 conducts, capacitor 102 is effectively coupled to ground and the oscillations present on the waveform are integrated by capacitor 102. Since the filter will not integrate the primary waveform 121 until the zener breakdown voltage is reached, the fast rise time of the waveform is preserved. The filter, which is voltage sensitive, presents a substantially square wave to the base of transistor 105. Transistor 105 acts to further shape the primary circuit waveform. The collector of transistor 105 is connected to the base of transistor 106. Transistor 106 provides additional wave shaping and inverts the waveform for application to the circuits which follow. Zener diode 107, which is connected between the collector of transistor 107 and ground, clamps the amplitude of the square wave output to a fixed value. The second input of pulse shaper 100 detects the opening and closing of the breaker points when transistor 51 of ignition control switch 50 is conducting. The small voltage pulses thus detected are applied by way of resistor 108 to the base of transistor 109. Transistor 109 acts to amplify these pulses and the output at the collector of transistor 109 is connected to the base of transistor 110. Transistor 110 inverts the detected pulses, and the output at the collector of transistor 110 is connected by way of diode 111 to the base of transistor 105. These detected pulses therefore appear at the output of transistor 106 in the same manner as the detected pulses from the ignition primary circuit.

The square wave pulses 100a from pulse shaper 100 are also applied as indicated above to the input of differentiating circuit 400 via conductor 130. Capacitor 401 having one terminal connected to the input 130 is connected at the other terminal to the output of differentiating circuit 400 by way of diode 402. The junction formed by capacitor 401 and diode 402 is connected to +V by way of resistor 403. Capacitor 401 differentiates the leading edge of the input square wave 100a into a positive voltage spike (not shown) and the trailing edge into a negative voltage spike 400a. The diode 402 clips the positive voltage spike leaving the negative spike pulse 400a which is representative of the closing of the breaker points. Resistor 403 provides a back-bias voltage which must be exceeded by the negative spike pulse 400a in order to obtain an output. Thus, immunity from false signals such as ignition and power supply noise is provided. The output of differentiating circuit 400 is connected to the R input of bistable 700 over conductor 410.

The output from NAND gate 500 is also applied to inhibit circuit 800 through switch 510. With switch 510 closed as shown, the negative going leading edge 500a of the output signal 500b from NAND gate 500 is applied to the base of NPN transistor 801 by way of diode 802. Transistor 801 acts as an inverter to convert the negative pulse 500b at its base to a positive pulse at the collector. The output at the collector of transistor 801 is connected to one terminal of capacitor 803 whose other terminal is connected to ground by way of resistor 804 and to the anode of diode 805. Capacitor 803, resistor 804 and diode 805 form a differentiating circuit. The leading edge of positive pulse is converted to a positive voltage spike 805a at the cathode of diode 805. The cathode of diode 805 is connected to the base NPN transistor 806.

The emitter of transistor 806 is connected to ground and the collector is connected to +V by way of resistor 807. The collector of transistor 806 is also connected to the base of NPN transistor 808 by way of capacitor 809. The collector of transistor 808 is connected to +V by way of resistor 810. The base of transistor 808 is also connected to the collector of PNP transistor 811. The emitter of transistor 811 is connected to the +V by way of variable resistor 812. Initially, transistor 808 is conductive and transistor 808 is not conductive. Capacitor 809 is, therefore, charged to nearly +V by the high present at the collector of transistor 806. When a positive pulse is applied to its base, transistor 806 turns on. The collector, therefore, goes low and the voltage stored in capacitor 807 appears negative at the base of transistor 808. The negative voltage turns transistor 808 off and its collector, therefore, goes high. The positive voltage appearing at the collector of transistor 808 is applied by way of resistor 813 to the base of transistor 806 and, therefore, holds that transistor on even after the input pulse has terminated. Transistor 808 remains off until capacitor 807 discharges through conductive transistor 806. When capacitor 807 has fully discharged, the base of transistor 808 becomes positive and transistor 808 begins to conduct. The collector of transistor 808 then goes low, and this potential is again applied by way of resistor 813 to the base of transistor 806 turning that transistor off. Thus, the positive voltage spike 805a applied to the base of transistor 806 is converted to a square wave output 808a at the collector of transistor 808. The duration of the square wave 808a is established by the time constant of capacitor 807 in combination with variable resistor 812 and the series impedance of transistor 811. The duration of the square wave output pulse 808a is set equal to the time interval between two successive ignition pulses by adjusting variable resistor 812. The output of reference voltage source 28 is also connected to the base of transistor 811. Therefore, if the reference voltage is increased, representing a decrease in the reference engine speed, the base of transistor 811 will be biased more positively. Since transistor 811 is a PNP transistor, the more positive bias will increase its series impedance; and, the increased impedance will result in a longer time constant or longer square wave output pulse at the collector of transistor 808. The duration of the inhibit circuit 800 output pulse will thus track the reference voltage. The output of inhibit circuit 800 is connected to the second input of ramp generator 300 at the anode of diode 310 via conductor 820. The ramp voltage output 300a from ramp generator 300 will be clamped to zero amplitude when the output of inhibit circuit 800 is high. Hence the output of inhibit circuit 800 provides a prolonged discharge pulse having a variable pulse width substantially equal to one ignition period at the reference speed.

The output of pulse shaper 100 is also connected via conductor 130 to the input of counter 200. Counter 200 counts the square wave pulses 100a and provides a low output after a predetermined number of such pulses have been counted. The output of counter 200 is connected to the S input of bistable 700 by way of diode 201. The counter 200 includes a reset input R which is connected to the output of NAND gate 500 via conductor 520. A low potential at the output of NAND gate 500 clears the counter 200 for another count.

The output of pulse shaper 100 is also connected to the input of electronic tachometer 900. Differentiating circuit 901 provides a positive spike pulse 901a representative of the opening of the breaker points. A conventional monostable circuit 902 converts the spike pulse into a square wave 902a; and the time constant of monostable circuit 902 is selected to provide a pulse width equal to or less than the pulse repetition rate of the maximum engine speed. The output of monostable circuit 902 is connected by way of resistor 903 to the positive terminal of voltmeter 904, which is calibrated in R.P.M. to provide an indication of engine speed.

Reference is now made to FIG. 6a – 6f wherein there are illustrated timing diagrams showing two complete cycles of operation of the circuit illustrated in FIG. 5. FIG. 6a represents the inputs 121 and 123 to pulse shaper 100 as obtained from ignition control switch 50. FIG. 6b illustrates the output 100a of pulse shaper 100. FIG. 6c illustrates the ramp voltage 300a developed by ramp generator 300, and further illustrates the relationship of the reference voltage 618 to the amplitude of the ramp voltages. In FIG. 6d the output of comparator 600 is represented as a negative going pulse 600a. FIG. 6e illustrates the output 500b of NAND gate 500. The discharge pulse 808a from inhibit circuit 800 is represented by FIG. 6f.

The leading edge 610 of every output pulse from pulse shaper 100, representing the opening of the breaker points resets the output 300a of ramp generator 300 to zero amplitude as at 612. The ramp voltage 300a increases linearly as at 614 during the time interval between successive pulses. The output of comparator 600 remains high 616 until the ramp voltage increases to a value equal to the reference voltage 618. As the speed of the engine decreases, the time interval between successive pulses increases allowing the ramp voltage 300a to increase. When the ramp voltage equals the reference voltage, the output of comparator 600 goes low 620 which, in turn, sets the Q output 700a of bistable 700 high. When the breaker points 16 open, thereby providing a high to the second input of NAND gate 500, the output 500b of NAND gate 500 will go low since the first input is held high by the Q output. The low output from NAND gate 500 turns transistor 51 off thereby permitting the magnetic field stored in the ignition primary circuit to collapse which results in a synchronized ignition firing. The leading edge 610 of the output pulse from pulse shaper 100 also resets ramp generator 300 since the leading edge 500a of the output signal from NAND gate 500 activates inhibit circuit 400, ramp generator 300 remains reset. The discharge pulse 808a from inhibit circuit 400 holds the ramp voltage output at zero amplitude 622 for substantially one ignition pulse period. When the ramp voltage is reset, the output of comparator 600 goes high (616). However the Q output of bistable 700 remains high until a low is applied to its reset input. The trailing edge 624 of the output pulse 100a from pulse shaper 100, representing the closing of the points, resets the Q output of bistable 700 to a low and simultaneously pulls the second input to NAND gate 500 low. The NAND gate 500 output 500b therefore goes high turning transistor 51 on; and, the ignition, thereby, remains inhibited until the increasing time interval between successive pulses again permits the ramp voltage to 300a to increase to the reference voltage level 618.

Referring again to FIG. 5, in practice it is desirable to disable inhibit circuit 800 during the engine starting sequence. The engine is thereby allowed to accelerate to the desired speed before the interruption technique is applied. The inhibit circuit 800 is disabled by opening switch 510 to start position 510a. The counter 200 is included in the apparatus shown in FIG. 5 to avoid the possibility of accumulating an unburned fuel mixture in the engine exhaust system as described with respect to FIGS. 3 and 4. The counter 200 is arranged to provide a low output after 10 pulses have been counted. Since the counter 200 includes a reset input R which is connected to the output of NAND gate 500, the counter will force an ignition firing only if the ignition is inhibited for 10 consecutive pulses.

As a specific example of the operation of the apparatus shown in FIG. 5, the reference voltage may be set to any desired speed of operation. As the engine throttle is advanced slightly above its idle speed setting, the engine speed will increase up to the speed corresponding to the reference voltage. Thereafter, the throttle can be advanced to its wide-open-throttle position without a further increase in engine speed.

What has been described is a process and apparatus for providing a simulated load to an otherwise unloaded internal combusiton engine. The present invention allows an engine to operate without external loading over the range of speed and throttle settings which have only been attainable by dynamometer or road loading, and further permits the maximum fuel and air mixture to enter the cylinders for the development of full load pressure. In practice, this is of great assistance in the overall performance testing of engines.

It should be understood that the invention is not limited to four-cylinder engines but would also be operative in engines having a greater or smaller number of cylinders. Also, the method of inhibiting the ignition is not limited to the shunt switch as shown in the drawings. The switch may also be adapted in series with the primary winding or distributor lead. However, the shunt method is preferred because of its simple installation by merely clipping two wires across the breaker points. Further, while the embodiments of the present invention are shown in conjunction with a conventional spark ignition engine, employing a coil and breaker points, it will be appreciated that the invention is equally applicable to other types of engines, such as, diesel (spontaneous ignition) engines, by interrupting the fuel insertion or injection systems.

What is claimed is:

1. Apparatus for providing a simulated load to an internal combustion engine having an ignition system to produce ignition, comprising: first means for inhibiting said ignition in response to a control signal; and second means for providing a variable inhibit period, and including third means for detecting the speed of said engine, comparison means having a first input coupled to said third means, said comparison means having a second input coupled to a reference means for comparing said speed to said reference means, said second means further including output means coupling said comparison means to said first means to provide said control signal in response to variations of said speed about the reference means for inhibiting said ignition during said period when said speed exceeds said reference means.

2. The apparatus of claim 1 wherein said third means includes tachometer means coupled to said engine.

3. The apparatus of claim 2 wherein said reference means includes reference speed means.

4. The apparatus of claim 3 wherein said reference speed means includes adjustable speed means.

5. A method for loading an internal combustion engine with a simulated load equivalent to a given actual load, said engine having at least one cylinder and having a throttle which alters the speed of said engine in accordance with throttle settings, said method comprising the steps of: periodically inhibiting the occurrence of cylinder ignition to adjust the indicated horsepower of said engine to a value substantially equal to the frictional horsepower of said engine at a given speed, thereby to provide a resulting substantially constant engine speed equal to said given speed; and adjusting said throttle to its wide-open-throttle setting wherein the accompanying resulting engine speed corresponds to the engine speed which would result if said engine were actually loaded with said given actual load at said wide-open-throttle setting.

6. A method for loading an internal combustion engine with a simulated load equivalent to a given actual load, said engine having a throttle for altering the speed of said engine in accordance with throttle settings, said method comprising the steps of: detecting the speed of said engine; comparing the speed of said engine to a reference speed to provide an error signal indicative of the difference between the engine speed and the reference speed; adjusting the indicated horsepower of said engine in response to said error signal to control the speed of said engine to a value substantially equal to said reference speed, thereby to provide a throttle setting and engine speed which is substnatially equivalent to the throttle setting and engine speed which would result if said engine were actually loaded with said given actual load.

7. A method for loading an internal combustion engine with a simulated load equivalent to a given actual load, said engine having at least one cylinder and having a throttle which normally controls the speed of said engine between minimum and maximum speed values, said method comprising the steps of: periodically inhibiting cylinder ignition of said engine to reduce the indicated horsepower developed by said engine to a value substantially equal to a selected frictional horsepower, which frictional horsepower corresponds to a given speed of said engine, thereby to provide a a substantially constant engine speed equal to said given speed; and adjusting said throttle to any desired throttle setting corresponding to the throttle setting which would result if said engine were actually loaded with said given actual load at said given speed.

8. The method according to claim 7 including the step of adjusting the inhibit cycle in response to engine speed variations from said substantially constant speed.

9. Apparatus for providing a simulated load to an internal combustion engine, said engine having a throttle which normally controls the speed of said engine between minimum and maximum speed values and having an ignition system which normally provides ignition periods at a rate related to the speed of said engine, comprising:

first means for detecting the speed of said engine and for producing an output signal which is related to the speed of said engine;

second means for providing a reference speed signal which represents a given speed of said engine;

comparison means coupled to said first and second means for comparing the detected speed of said engine with the reference speed to provide a control signal representative of the difference between said detected speed and said reference speed; and means coupling said comparison means to said ignition system for inhibiting the occurrence of ignition in response to said control signal to substantially maintain the speed of said engine at said given speed at any given throttle setting between said minimum and maximum speed values.

10. The apparatus according to claim 9 wherein said second means includes means for adjusting said reference speed signal between minimum and maximum representative speeds corresponding to said minimum and maximum speed values.

11. A method for testing an internal combustion engine in a simulated environment wherein said engine is operated with a simulated load equivalent to a given actual load, said engine having a throttle which alters the speed of said engine in accordance with throttle settings, said method comprising the steps of:

periodically inhibiting the ignition of said engine in a predetermined ignition-on to ignition-on plus ignition-off ratio at which ratio the indicated horsepower developed by said engine is substantially equal to the frictional horsepower of said engine at a given engine speed so that a substantially constant engine speed equal to said given engine speed results; and adjusting said throttle to any desired setting so that each throttle setting corresponds to the throttle setting which would result if said engine were actually loaded with said given actual load at said resulting constant engine speed.

* * * * *

UNITED STATES PATENT OFFICE
CERTIFICATE OF CORRECTION

Patent No. 3,757,570          Dated Sept. 11, 1973

Inventor(s) Richard Thomas Cowley and Leonard Robin Hulls

It is certified that error appears in the above-identified patent and that said Letters Patent are hereby corrected as shown below:

Title page, left column, following line [21] and before line [52] insert --Foreign application Priority Data Oct. 27, 1970 Great Britain 50986/70.--

Column 1, line 51, change "drive" to read --driven--.

Column 1, line 59, change "hav" to read --have--.

Column 3, line 64, change "is" to read --as--.

Column 6, line 64, change "pluse" to read --pulse--.

Column 9, lines 18, 19, cancel "which is adjustable".

Column 9, line 18, after "voltage" insert --from source 28.--

Column 11, line 34, change "HL710" to read --µL710--.

Column 14, line 25, change "circult" to read --circuit--.

Signed and sealed this 2nd day of April 1974.

(SEAL)
Attest:

EDWARD M. FLETCHER, JR.
Attesting Officer

C. MARSHALL DANN
Commissioner of Patents